Figure 1:
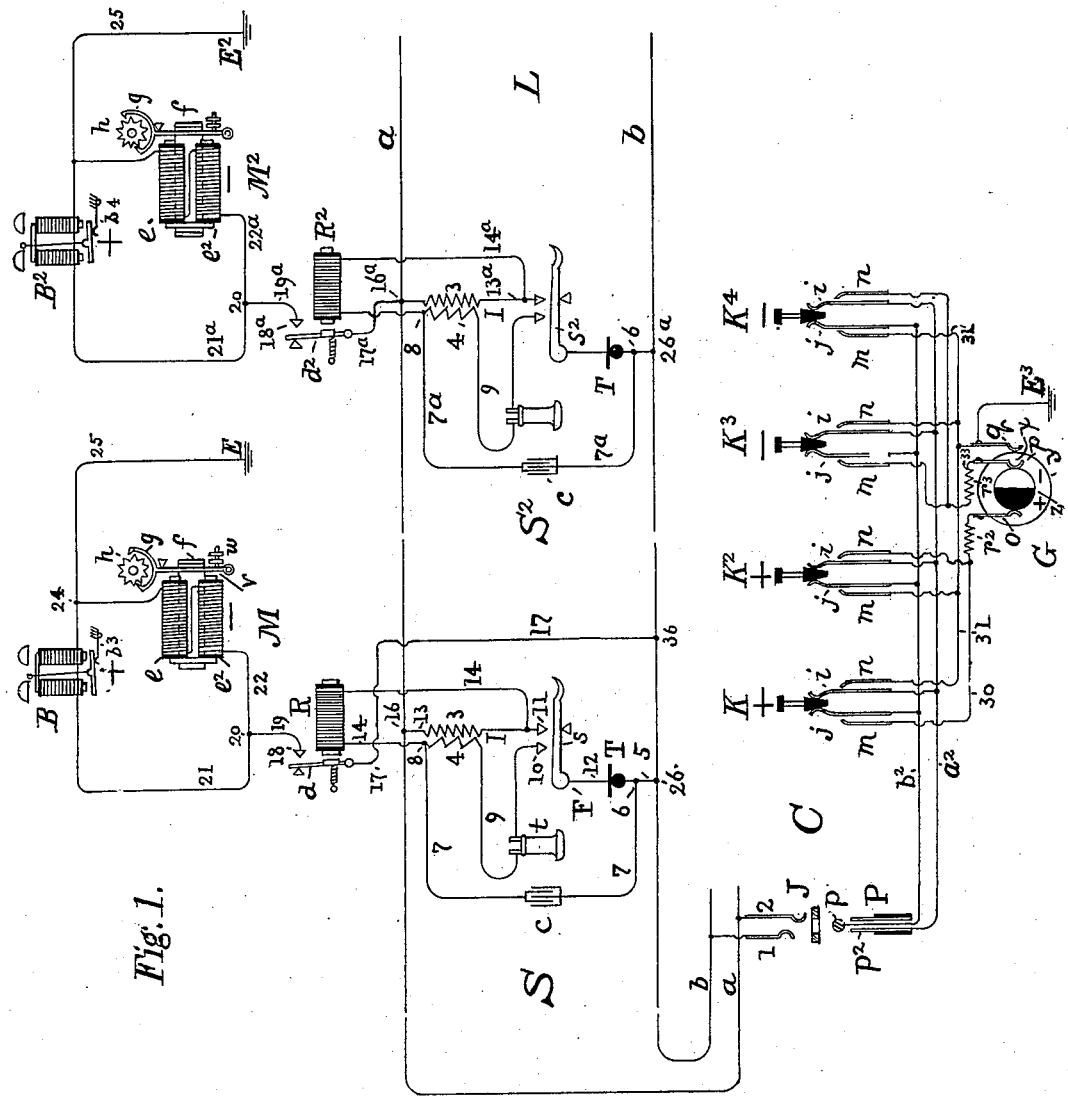

No. 666,706. Patented Jan. 29, 1901.
H. E. SHREEVE.
SELECTIVE SIGNALING AND REGISTERING APPARATUS CIRCUIT.
(Application filed Sept. 18, 1900.)
(No Model.) 2 Sheets—Sheet 1.

WITNESSES:
Joseph A. Gately
Geo. Willis Pierce

INVENTOR.
Herbert E. Shreeve
BY Philip Mauro
ATTORNEY.

No. 666,706. Patented Jan. 29, 1901.
H. E. SHREEVE.
SELECTIVE SIGNALING AND REGISTERING APPARATUS CIRCUIT.
(Application filed Sept. 18, 1900.)

(No Model.) 2 Sheets—Sheet 2.

WITNESSES:
Joseph A. Galely
Geo. Miller Pierce

INVENTOR.
Herbert E. Shreeve
BY Philip Mauro,
ATTORNEY.

UNITED STATES PATENT OFFICE.

HERBERT E. SHREEVE, OF DEDHAM, MASSACHUSETTS, ASSIGNOR TO THE AMERICAN BELL TELEPHONE COMPANY, OF BOSTON, MASSACHUSETTS.

SELECTIVE SIGNALING AND REGISTERING APPARATUS CIRCUIT.

SPECIFICATION forming part of Letters Patent No. 666,706, dated January 29, 1901.

Application filed September 18, 1900. Serial No. 30,427. (No model.)

*To all whom it may concern:*

Be it known that I, HERBERT E. SHREEVE, residing at Dedham, in the county of Essex and State of Massachusetts, have invented certain Improvements in Selective Signaling and Registering Apparatus Circuits, of which the following is a specification.

In party-line telephone-circuits where a plurality of substations are connected with the same line, each having signals adapted to be selectively operated from the central station, it becomes necessary when measured service is applied to the substations that means be associated with the said substations for operating registering or meter devices arranged to register the connections initiated by the subscribers at the substations and completed by the operator at the central station, and such registering or meter devices may be placed at the substations or be located at the central station, as may be preferred.

The present invention relates to that class of selective devices for party-line circuits wherein plus and minus currents may be transmitted at will over either or both conductors of a metallic circuit, the selective translating devices of the substations being connected in branches to earth from the said main conductors, respectively, substantially as described in Patent No. 644,647, granted to George K. Thompson and Ernest C. Robes and dated March 6, 1900, to which reference is made, as the devices for sending the operative currents and for operating the selective translating devices are operated therein as they are in this invention.

The invention comprises a metallic main circuit extending between a central station and two substations, so arranged that each main conductor of the circuit is provided with a principal normally-disunited branch divided or split into two grounded subbranches in parallel with each other, a biased polarized electromagnetic call-bell being included in one of said grounded branches and a biased polarized electromagnetic service-meter in the second branch at each of the substations—that is to say, at one station the polarized call-bell is in one parallel subbranch of the normally-detached main earth branch associated with one main conductor, and the polarized service-meter is in the second parallel subbranch thereof, and at the second station the call-bell and meter are in the respective parallel subbranches of a normally-detached main earth branch from the second main conductor. A relay-switch at each station connected in series with a condenser in a bridge between the main conductors controls the connection of the main ground branch (and thereby the selective devices in the parallel branches) and the appropriate main conductor, maintaining the normal severance when the circuit is at rest, uniting the main branch to the main conductor while the selective signal and meter currents are being sent from the central station to either substation, and again severing the main branch from the main conductor after the said currents have been transmitted. The bridged relay at each substation is a neutral relay—*i. e.*, non-polarized and slow in demagnetization—and is so constructed that when a sufficiently strong intermittent or alternating current of either direction is caused to pass through its electromagnetic coils its armature is attracted to its forward position and remains attracted as long as the transmission of such current continues, and the said current after operating the relay to close the said main disunited branch is adapted to energize the selective device in one of the said multiple grounded branches, as hereinafter described.

Keeping in mind the patent of Thompson and Robes, to which reference has been made, wherein four call-bells at as many substations are selectively operated by current-selecting means described herein, it has been discerned that four selective devices may be separately thus operated without regard to the particular object to be attained, and my invention is based upon this fact. As a concrete exemplification of the idea this specification discloses a system wherein the call-bells at the two substations may be operated by an intermittent plus current and that the counting or registering devices may be operated by an intermittent minus current, or vice versa, it being well understood that a different arrangement is within the scope of the invention.

Figure 2:
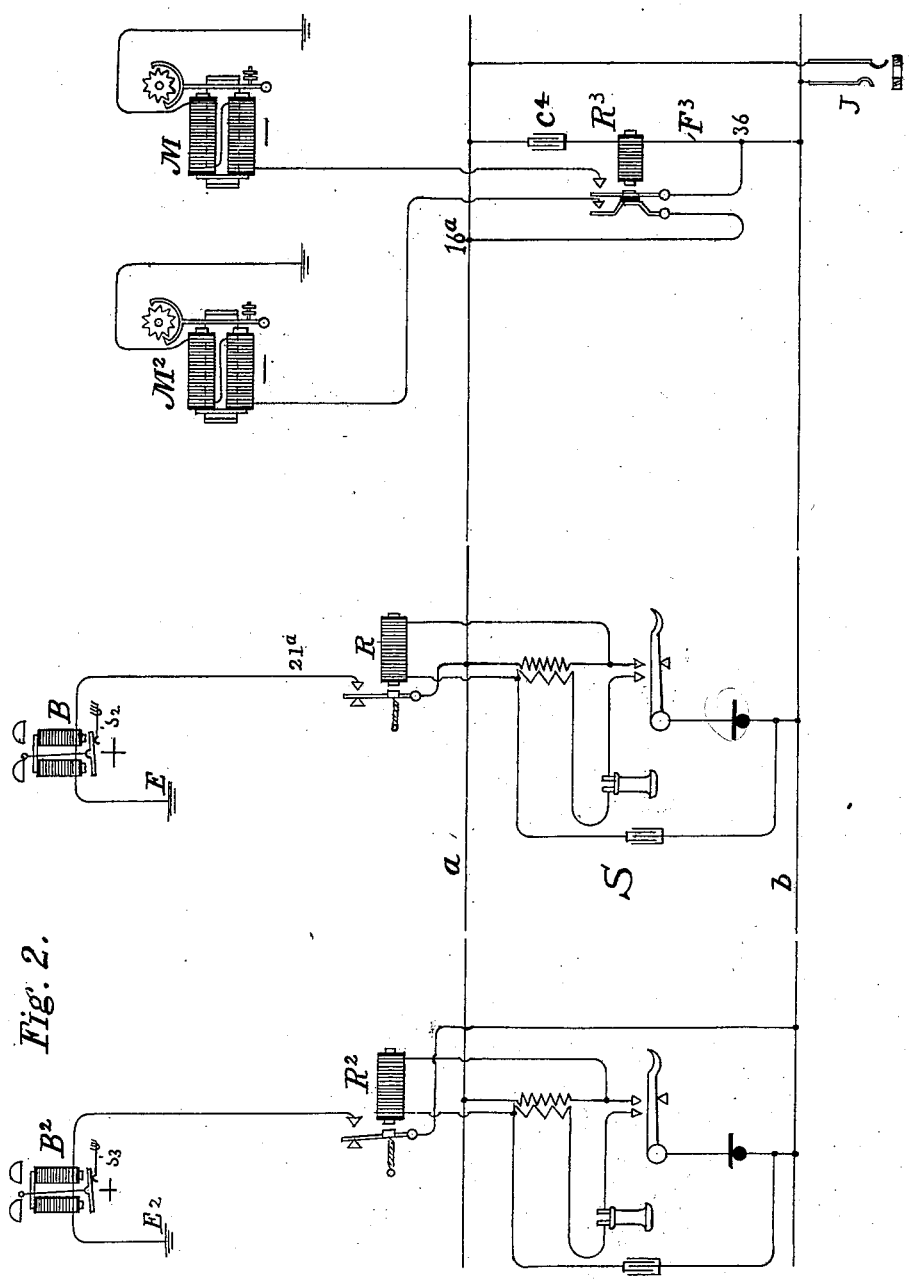

Referring to the drawings which illustrate the invention, Figure 1 is a diagram showing a two-party line extending from a central station where there are selective-current keys to two substations, each having a call-bell and a metering device; and Fig. 2 is a diagram of a similar circuit in which the meter devices are represented as being placed at the central station.

Referring to Fig. 1 of the drawings, L is the main telephone-circuit, extending between the central station and two substations S and S², and $a$ and $b$ represent the two conductors thereof.

J represents a spring-jack or switch-socket in the switchboard at the central station, one spring-jack only being shown, it being understood that the circuit may be represented by spring-jacks upon any number of switchboard-sections.

P is a switch-plug at the central station adapted for insertion into the spring-jack J, and when inserted its conducting-surfaces $p$ and $p^2$ engage the respective springs 1 and 2, thereby uniting the two main conductors $b$ and $a$, respectively, to the cord circuit-conductors $b^2$ and $a^2$.

At each substation there is a normally open telephone-bridge F from point 16 on conductor $a$ to point 26 on conductor $b$, adapted when closed (by the removal of the receiving-telephone from the switch-hook $s$) to include the switch itself, its contact-point 11, the secondary winding 3 of the induction-coil I, and the microphone T, while associated with said bridge and forming, in fact, a parallel branch of a portion thereof is a local circuit extending by conductor 7 from point 6 on part 5 of said bridge F, through the condenser $c$ to point 8, and thence through the primary winding 4 of said induction-coil, and by conductor 9 through the receiver $t$ to the switch-point 10. Also at each substation in a bridge between the two main conductors $a$ and $b$ of the main circuit is a slow discharging or demagnetizing neutral relay R, which is adapted to respond to the transmission over the two conductors of the main circuit of an intermittent selective current by the attraction of its armature $d$ to the front stop 18 thereof and by the steady maintenance of such attraction as long as the current continues. This bridge is traceable from point 16 on conductor $a$ through conductor 13, secondary coil 3, conductor 14, including the winding of relay R, point 8, conductor 7, and condenser $c$ to point 26 on conductor $b$. At substation S the armature $d$ is connected by conductor 17 with point 36 on conductor $b$, while at substation S² the armature $d^2$ of corresponding relay R² is connected by wire 17ª with the point 16ª on the main conductor $a$. Any relay may be employed, as the relays R and R², provided its construction and adjustment is such that when placed in series with a condenser and submitted to the action of an intermittent current, it will under a wide range of the frequency of the intermissions attract its armature steadily to the contact-point 18 and maintain its position notwithstanding the recurrence of an intermission between each two emissions of current as long as the said current continues.

At substation S and at substation S², respectively, are normally open or disconnected branches 19 and 19ª, divided at the point 20 into two subbranches 21 and 22, shown as being united at point 24 to a common ground-terminal 25, the subbranches 21, containing the call-bells B and B², biased to respond, say, to positive or plus impulses of current, and the subbranches 22, containing the service-meters M and M², biased or wound to respond to negative impulses of intermittent current. The said earth branches 19 and 19ª are normally discontinuous between the armatures of the relays R and R² and their front stops 18 and 18ª owing to the normally-retracted position of said armatures; but when an intermittent current of either sign from the central station passes through the windings of the relays they become energized and attract their armatures to their front contacts, and the parallel earth branches at each substation are closed to their own main conductor, so that the selected call-bell or meter device can then be operated by the action of the said current if of the proper direction. The armatures of the relays thus operate as switches to control the grounded branches of the substations and to temporarily unite them to the prearranged main conductors.

It has been hereinbefore assumed that the call-bells at the two substations are to be selectively operated by an intermittent current of determinate sign and that the meter devices at said substations are to be selectively operated by an intermittent current of opposed sign transmitted from the central-station generator G on the depression of the appropriate key of the keyboard, and to effect such results with the call-bells which are of the well-known polarized kind the call-bell armatures at the respective substations are provided with the biasing-springs $b^3$ and $b^4$, arranged to press upon one end of said armatures and to hold them in the position to which, if left free, they would be attracted by currents of minus sign.

The service-meters each consist of two electromagnets $e\ e^2$, the cores of which are yoked together and which are polarized by the permanent magnet $f$. The windings of these electromagnets are connected in series, as shown, and so wound that when current flows through them like poles are adjacent to the armature $v$. The lever of armature $v$ carries upon its free end a pallet $g$, adapted to effectuate the revolution of a ratchet-wheel $h$, and thereby operate registering mechanism of usual character, but not shown. The armature is arranged to be in a state of equilibrium normally or when not attracted and is provided with a delicately-adjustable weight $w$ to counteract any tendency which it may have to stick in its forward position after the current has ceased to flow through the windings of the electromagnets, which are sluggish in demagnetization and are adapted to hold the armature attracted while the current is transmitted. The armatures of the service-meters at both substations are thus adapted to respond to intermittent currents of negative sign, and when they pass from a state of equilibrium toward the poles of their electromagnets the pallets cause the register to advance one half a unit division, and when the armatures fall off upon the cessation of the current the pallets cause the register to advance the second half of the unit division, thus recording a unit.

The intermittent-current-transmitting apparatus at the central station consists of the keys K, $K^2$, $K^3$, and $K^4$, with their associated connecting-plug P and current-generator G. The said plug is adapted to be inserted in the spring-jack J in order that current from the generator may be transmitted by either of the keys to any one of the selective devices at the substations. G may be any suitable generator adapted to develop and deliver to the supply-conductors 30 and 31 intermittent currents of positive and negative direction, respectively, by means of the brush-springs $o$ and $x$, which bear upon the commutator $z$, which in a manner well understood is constructed with a non-conducting and a conducting portion, each of which passes under the springs $o$ and $x$ once in each revolution, and the generator-armature winding has one terminal attached to the said conducting portion and the other to the metal ring $y$, on which the spring $q$, to which the permanent ground connection $E^3$ and one terminal of the generating-helix are connected, continuously bears. The springs $o$ and $x$ are so adjusted that the former is in connection with the commutator-conductor during the development of current impulses of one direction or sign and the latter during the development of impulses of opposite sign. The line-springs of the keys are marked $i$ and $j$ and connect with the keyboard and plug circuit-conductors $a^2$ and $b^2$, and thereby with the main conductors $a$ and $b$, respectively. The earth conductor $E^3$ is branched by conductor 31 to the operative springs $n$ of the keys K and $K^3$ and the operative springs $m$ of keys $K^2$ and $K^4$. The positive supply-conductor 30 branches to operative springs $m$ and $n$ of the respective keys K and $K^2$, and the negative supply-conductor 33 to the springs $m$ and $n$ of the respective keys $K^3$ and $K^4$.

In the operation of the invention if call-bell B at substation S is to be rung, the plug P being in the spring-jack J, the key K is pressed so that the springs $j$ and $i$ are brought into contact, respectively, with the springs $m$ and $n$, thus forming a circuit from the positive brush-spring $o$ of the generator, by way of conductor 30, key-springs $m$ and $j$, conductors $b^2$ and $b$, points 26 and 6, conductor 7, including the condenser $c$, point 8, conductor 14, including the winding of the relay R, conductor 13, including the secondary 3 of the induction-coil I, main conductors $a$ and $a^2$, key-springs $i$ and $n$, and conductor 31, to the earth connection $E^3$, and thus to the other generator-pole. Steadying or reducing resistances $r^2\, r^3$ of any necessary magnitude may be introduced into the cord conductors 30 33, if desired. An intermittent current of plus sign is thus caused to circulate in the circuit which has just been traced, and this current obviously passes to substation $S^2$ also, traversing there similar normal circuit arrangements, and the relays R and $R^2$ are consequently actuated to attract their armatures $d\, d^2$ to their front stops 18 and $18^a$, and thus bring the station earth branches 21 and 22 at station S, with $21^a$ and $22^a$ at station $S^2$, into direct conductive connection with the respective main conductors $a$ and $b$. Although both relays operate, the call-bell at station S is alone of all the devices included in the multiple branches operated, it having been selected by the use of the key K. The intermittent plus current transmitted by the said key K passes to the earth branch 21 at said station S and through the magnet of bell B to earth E, and the bell being biased to respond to this particular current rings continuously as long as the key-pressure is maintained, as a sufficient portion of the current leaving conductor $b$ at point 36 passes, via conductor 17, armature $d$, contact-stop 18, to point 20, and thence by conductor 21 and bell-magnet B to earth E. The meter device M associated with the first substation S does not operate, though its magnet does receive current, because the said magnet is polarized to be responsive to currents of opposite sign only, and if the bell-actuating current in said magnet has any effect at all it is to strengthen the repulsion of the armature. The bell and register mechanisms at substation $S^2$ both remain unaffected, because, though the relay $R^2$ at said station is operated, the act of pressing the key establishes a dead earth $E^3$ on the main conductor $a$ through the key-contacts $i$ and $n$, which shunts the resistances of the magnets of said mechanisms, so that practically none of the current reaches the substation earth $E^2$ or passes through said magnets; but if the key $K^2$ be pressed the call-bell at substation $S^2$ alone responds, the other translating devices of the circuit remaining quiescent, for in this case the current impulses of plus sign reach the said bell $B^2$ directly over the main conductor $a$, the devices at station S now being shunted and the meter at station $S^2$ being irresponsive to current impulses of opposite direction. By considering the connections of the key $K^2$ it will be seen that on depressing such key the main conductor $a$ is connected with a pole of the generator during the development of plus impulses at such pole, this occurring by means of the contact established between the key-springs $i$ and $n$, while the conductor $b$ at the same time, by the contact between the springs $j$ and $m$, is at once grounded and also connected with the other generator-pole.

To operate the electromagnetic meter device M at substation S, the key K³ is depressed, the springs $j$ and $i$ close upon the respective springs $m$ and $n$ of said key, and a circuit is formed over which intermittent negative impulses pass as follows: spring-brush $p$ of generator G, conductor 33, springs $m$ and $j$, conductors $b^2$ and $b$ to points 26, 36, and 26ª on the latter conductor, and from point 26 by conductors 7 14, relay R, conductors 13 $a$ $a^2$, key-springs $i$ and $n$, conductor 31 to the other brush $q$ and earth E³. Current also passes from point 26ª over conductors 7ª 14ª and relay R² and conductor 13ª to main conductor $a$ and back to earth E³, the result being that both relays R and R² are energized and attract their armatures $d$ and $d^2$ to their forward contacts 18 and 18ª, and a path is made over which current traverses from the point 36 on main conductor $b$ to the earth E over the parallel branches 21 and 22 at substation S. As the negative impulses pass through the electromagnets $e$ and $e^2$ of the meter M at substation S the armature $v$ is attracted, causing the pallet $g$ to advance the ratchet-wheel one-half a division of the unit space upon the dial, (not shown,) and owing to the sluggishness of said magnets the armature is held up to the poles of the magnets, which owing to their construction are both of one polarity, as long as the pressure of the key and the consequent transmission of the intermittent current continues; but when the key K³ is released and the circuit from the generator G broken the armature falls back and the pallet advances the wheel $h$ the remaining one-half division, thus completing the registration of a connection on the dial. The current does not affect the bell B, because it is of sign opposite to that designed for the operation thereof, and the bell B² and meter device M² at substation S² are not operated or disturbed, because no operative current reaches them, they being shunted by the grounding of main conductor $a$ in the key K³ through the contact established between the springs $i$ and $n$ in the manner indicated in describing the operation of the bells B and B². Of course the bell B² is further protected by its polarity, and to cause the meter device M² at substation S² to register a connection the key K⁴ is pressed, so that its springs $j$ $m$ and $i$ $n$ are in contact, a circuit thus being formed over which intermittent negative impulses traverse from the spring-brush $p$ of the generator. In this case the main conductor $a$ is brought into connection with the active generator-pole through the contact established between $i$ and $n$, and main conductor $b$ is grounded and also connected with the other pole of said generator. The substation-relays R and R² both operate; but the meter M² only responds. The bell B² at the same station is not responsive to negative impulses, and therefore continues quiescent.

The meter at the substation S is shunted from the circuit by the ground established in the key K⁴ on the main conductor $b$, and the bell at substation S remains at rest, because it also is shunted by the grounded main conductor $b$ and also because it is irresponsive to negative or minus current impulses.

In Fig. 2 the meter devices are shown as being at the central station and in normally open earth branches from the respective main conductors of the circuit. Both branches are adapted to be closed by means of a neutral relay R³ (having the characteristics of relays R and R²) at the central station, the said relay being connected in series with a condenser $c^4$ in a bridge F³ between the said main conductors. The selective devices are operated by the depression of the keys shown in the keyboard, Fig. 1, and precisely the same results are achieved.

I claim—

1. The combination with the two main conductors of a metallic telephone-circuit connecting two substations with a central station; a grounded source of intermittent current at the central station; and four keys controlling the connection of said circuit and source, and adapted each to connect the two said main conductors with the two poles of said source, and respectively to connect one or the other of the said main conductors with either the positive or negative commutator-brush of said source; of four normally-detached earth branches, a pair for each main conductor; a polarized electromagnetic bell in one branch, and an oppositely-polarized electromagnetic call-register in the other branch of each pair; and means as indicated for connecting the said branches to their respective main conductors on the operation of any of the said keys, and for transmitting the appropriate current over either main conductor for the selective operation of the bell or call-register associated with the branches thereof; substantially as described.

2. In a telephone system, the combination with the main conductors of a metallic substation-circuit extending between the central station and two substations; of a polarized electromagnetic call-bell and an oppositely-polarized electromagnetic registering device or service-meter for each substation, connected in separate normally-detached earth branches of the said main conductors respectively; a slow-acting relay for each substation bridged between the said main conductors, and adapted when excited to connect the said branches with their appropriate main conductors; and means at the central station for simultaneously transmitting over the metallic circuit and through a grounded circuit comprising a selected one of the two main conductors, an intermittent current of either direction as desired, for the simultaneous operation of the branch-connecting relays, and the selected polarized call-bell or service-meter, substantially as set forth.

3. In a telephone system, the combination with a metallic or double-conductor main circuit; and a relay responsive to an intermittent current regardless of direction, and adapted to maintain the steady attraction of its armature during the passage of such current through its magnet-coils, the said relay being connected in a bridge of said main circuit; of normally-disconnected parallel earth branches controlled by the armature of said relay, and united thereby when in its attracted position to one of the said main-circuit conductors; a polarized electromagnetic bell, and an oppositely-polarized electromagnetic registering device or service-meter connected in the said two parallel branches, respectively, and adapted both to respond to intermittent currents, but of diverse direction; and means for transmitting an intermittent current of appropriate direction for the selective operation of either bell or meter as desired, through the grounded circuit formed of the earth branches and that one of the main conductors to which they are united, and through the metallic circuit formed of both main conductors and the relay simultaneously; substantially as set forth.

4. The combination of a metallic telephone-circuit extending between a central station and two substations; an earth branch comprising two parallel conductors associated at each substation with a different main conductor of said metallic circuit, but normally detached therefrom; sluggish or slow-acting neutral relays, as indicated, one at each substation, bridged between the two main conductors of said metallic circuit, and adapted on the excitement of its magnet to switch the said earth branches into connection with the appropriate main conductors; polarized electromagnetic bells biased or adjusted to respond to intermittent current impulses of definite but relatively indifferent direction, connected one at each substation in one of the parallel earth branch conductors thereat; an oppositely-polarized meter or registering device at each substation connected in the other parallel branch conductor thereof, and biased or adjusted to respond to intermittent currents opposite in direction to those which operate the bell; and means at the central station for transmitting over the appropriate main conductor intermittent currents of appropriate direction for the selective operation of either bell or meter at either substation; and for simultaneously transmitting the same current through the metallic circuit for the operation of the relays; substantially as described.

5. The combination of a metallic telephone-circuit extending between a central station and two substations; an earth branch divided into two parallel conductors, associated at each substation with a different one of the conductors of said main circuit, but normally detached therefrom; a sluggish or slow-acting neutral switching-relay as indicated, at each substation, bridged in series with a condenser between the main conductors of said circuit, and adapted on the excitement of its helices to switch the said earth branches of said substation into connection with their appropriate main conductor; polarized bells one at each substation biased or adjusted to respond to intermittent currents of like direction and having their helices in one of said parallel earth branch conductors at said substation; polarized meter or call-registering devices one at each substation adjusted to respond to intermittent currents also of direction like to one another, but opposite to that to which the said bells are adapted to respond; the said registering devices at each substation having their exciting-helices connected in the other parallel branch conductor of such substation; and means at the central station for impressing upon both main conductors intermittent currents of either direction for the operation of said relays, and pursuant to the operation of said relays, upon either main-conductor currents of appropriate direction for the selective operation of either bell or registering device at either station; as set forth.

6. In a telephone-signaling and meter system and apparatus, the combination with a metallic or double-conductor main circuit, of earth branches extending from the said main-circuit conductors but normally detached therefrom; sluggish or slow-acting neutral relays as indicated bridged in series with a condenser between the main conductors of said circuit, and adapted on the excitement of their helices to switch the said earth branches respectively into connection with their appropriate conductor; polarized bells and polarized meter devices, equal in number, having their helices in the said earth branches of the two main conductors respectively, the bells biased or adjusted to respond to intermittent currents of one sign or direction, and the meters biased or adjusted to respond to similar currents of opposite sign or direction; and means at the central station for impressing upon the two main conductors composing in series the said main circuit intermittent currents of either direction for the operation of the said relays and the consequent connection of the earth branches, and for simultaneously transmitting intermittent currents of definite direction over either one of the said main conductors and its earth branch continuations for the selective operation of the predetermined station bell or meter device; substantially as set forth.

In testimony whereof I have signed my name to this specification, in the presence of two subscribing witnesses, this 13th day of September, 1900.

HERBERT E. SHREEVE.

Witnesses:
  GEO. WILLIS PIERCE,
  JOSEPH A. GATELY.